United States Patent [19]

Hobo et al.

[11] 4,180,037

[45] Dec. 25, 1979

[54] INJECTION PUMP CONTROL SYSTEM

[75] Inventors: Nobuhito Hobo, Inuyama; Yutaka Suzuki, Nishio; Takashi Naito; Yoshimune Konishi, both of Kariya, all of Japan

[73] Assignee: Nippondenso Co., Ltd., Kariya, Japan

[21] Appl. No.: 846,018

[22] Filed: Oct. 27, 1977

[30] Foreign Application Priority Data

Dec. 26, 1976 [JP] Japan .................................. 51-157278

[51] Int. Cl.² ............................................. F02M 63/02
[52] U.S. Cl. ............................ 123/139 E; 123/32 EA; 123/32 AE
[58] Field of Search .... 123/139 E, 139 AG, 139 AK, 123/139 AT, 139 B, 139 BC, 139 BD, 139 BE, 138, 32 AE, 32 EA, 32 EL, 32 EF, 32 EH

[56] References Cited

U.S. PATENT DOCUMENTS

| | | | |
|---|---|---|---|
| 3,166,063 | 1/1965 | Schettler | 123/139 BC |
| 3,685,526 | 8/1972 | Hobo et al. | 123/32 EA |
| 3,731,664 | 5/1973 | Tsuzuki et al. | 123/102 |
| 3,762,379 | 10/1973 | Hobo et al. | 123/32 AE |
| 3,797,465 | 3/1974 | Hobo et al. | 123/32 EA |
| 3,896,779 | 7/1975 | Omori et al. | 123/139 E |
| 3,927,652 | 12/1975 | O'Neill | 123/139 AT |
| 3,943,892 | 3/1976 | Brinkman | 123/139 E |
| 4,064,884 | 12/1977 | Matsumoto et al. | 123/32 EL |

*Primary Examiner*—Gerald L. Brigance
*Attorney, Agent, or Firm*—Cushman, Darby & Cushman

[57] ABSTRACT

An injection pump control system comprises a plurality of pressure feed mechanisms each thereof including inner cams, pump plungers, etc., and provided in a rotor, a separate fuel inlet passage provided for each pressure feed mechanism, an electromagnetic valve provided for each fuel inlet passage to open and close the same, an electric control circuit for making the number of open-close operations of each electromagnetic valve equal to the number of operations of each pressure feed mechanism and for controlling the duration of opening of the electromagnetic valves in accordance with the operating conditions of an engine.

3 Claims, 5 Drawing Figures

INJECTION PUMP CONTROL SYSTEM

BACKGROUND OF THE INVENTION

1. Field of the Invention

The present invention relates to an injection pump control system for a distribution type fuel injection pump in which the rotation of a rotor causes plungers radially arranged therein to be oppositely reciprocately moved by the inner cams of cam rings arranged on the outer side of the rotor whereby fuel is introduced into and pressurized in pump chambers and then is successively distributed and delivered through a distribution mechanism to the respective cylinders of an engine. The control system comprises a plurality of electromagnetic valves each disposed in the fuel passage to each pump chamber, and the duration of opening of the electromagnetic valves is controlled by an electric control circuit to control the amount of fuel delivered.

2. Description of the Prior Art

In a known system of this type in which an electromagnetic valve is positioned in each fuel inlet passage whereby the amount of fuel drawn in during each suction stroke of the fuel pump is controlled in accordance with the duration of opening of the electromagnetic valve to thereby accomplish the fuel metering, the number of operations of the electromagnetic valves becomes equal to the number of fuel delivery operations (equal to the number of suction operations) of the fuel pump with the result that at high engine speeds the number of operations of the electromagnetic valve per unit time increases with increase in the number of cylinders and the operating cycle inevitably decreases. In the case of a four cycle engine having six cylinders and the maximum rotational speed of 3600 rpm, the operating cycle of the injection pump becomes 5.5 msec and consequently the possible maximum metering time of the electromagnetic valves becomes 5.5 msec. On the other hand, the operation of the electromagnetic valves involves a delay time of the order of 1.5 msec per driving timing pulse voltage, and consequently if this delay time becomes not negligibly great in relation to the operating cycle of the injection pump, this results in a deteriorated metering accuracy.

SUMMARY OF THE INVENTION

It is the object of this invention to provide an injection valve control system comprising a distribution rotor, a plurality of separate pressure feed mechanisms provided in the rotor and each having plungers adapted to be moved by inner cams, a plurality of fuel passages provided to lead respectively to the fuel inlets of the pressure feed mechanisms, an electromagnetic valve disposed in each of the fuel passages and adapted to be opened and closed, whereby the amount of fuel delivered per operation of each pressure feed mechanism is determined by each open-close operation of the electromagnetic valve and the duration of opening of the electromagnetic valves is electrically controlled by detecting the engine operating conditions, thus increasing the operating cycle period in proportion to increase in the number of the electromagnetic valves and thereby improving the metering accuracy as compared with the prior art system employing only one electromagnetic valve. In accordance with this invention, where a pair of separate pressure feed mechanisms are provided and an electromagnetic valve is disposed in each fuel passage leading to the fuel inlet of each pressure feed mechanism, the maximum metering time of a four cycle engine having six cylinders and the maximum rotational speed of 3600 rpm will become 11 msec which is two times that of the prior art systems. Another advantage of this invention is that where a plurality of electromagnetic valves are used, it is possible to accomplish a fuel control by groups for a multiple cylinder engine in accordance with the engine load. More specifically, where, for example, two electromagnetic valves are used for a six-cylinder engine so that each valve supplies fuel to each group of three cylinders, during idling and low load operation one of the electromagnetic valves alone may be actuated and the other valve may be closed to restrict the fuel supply to the cylinders in one group and stop the fuel supply to the remaining group, and when occasions demand, means adapted to hold the engine exhaust valves in the open position may for example be added to ensure improved fuel consumption during such operation.

DESCRIPTION OF THE PREFERRED EMBODIMENTS

The present invention will now be described in greater detail with reference to the illustrated embodiments.

Figure 1:
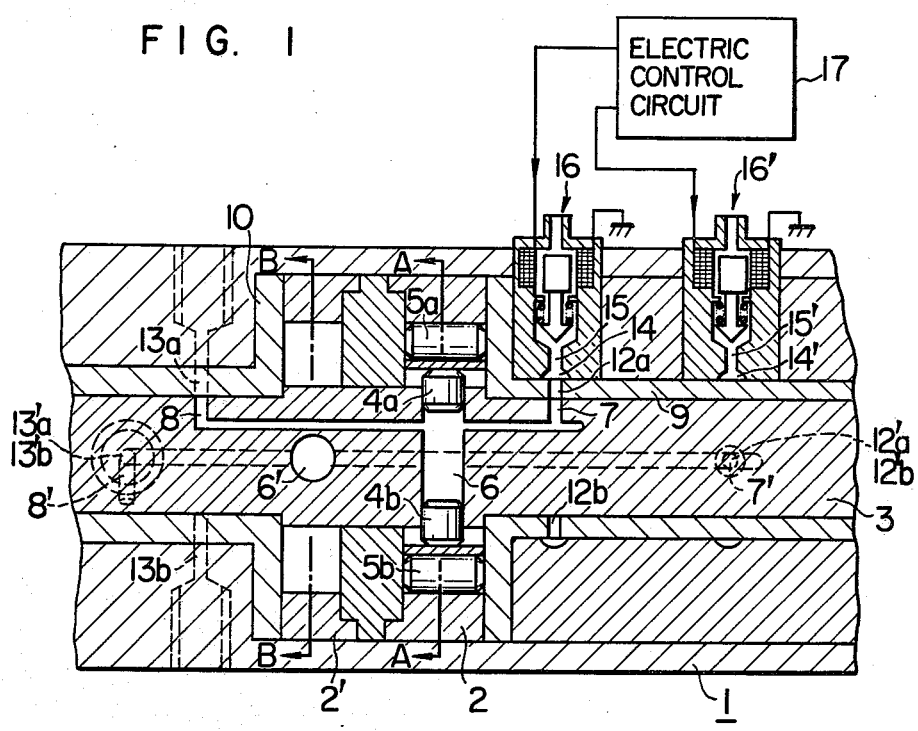
FIG. 1 is a sectional view showing the construction of an embodiment of the invention.
Figure 2A:
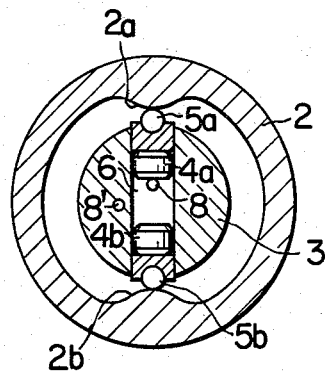
FIG. 2(a) is a sectional view taken along the line A—A of FIG. 1.
Figure 2B:
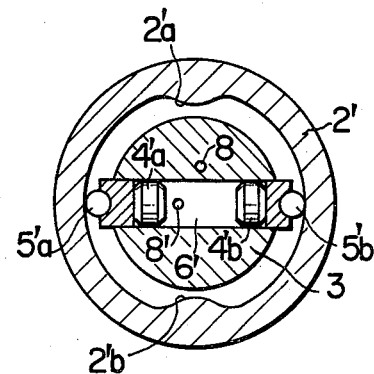
FIG. 2(b) is a sectional view taken along the line B—B of FIG. 1.

Referring first to FIG. 1 showing an embodiment of the invention incorporated in the fuel injection pump of a six-cylinder engine, numeral 1 designates a pump body, and 2 and 2' cam rings fixedly fitted in the pump body 1 and respectively including cam lobes 2a, 2b and 2'a, 2'b constituting inner cams. Numeral 3 designates a rotor operatively coupled to the engine crankshaft through a reduction gear and including therein pump plungers 4a, 4b and 4'a, 4'b which are radially arranged to make reciprocal motion, and the pump plungers 4a, 4b and 4'a, 4'b have their outer sides respectively placed in contact with rollers 5a, 5b and 5'a, 5'b respectively adapted to roll over the inner cams of the cam rings 2 and 2' and their inner sides respectively placed inside pump chambers 6 and 6' provided in the rotor 3. The pump chambers 6 and 6' are respectively communicated with fuel inlet ports 7 and 7' and distribution ports 8 and 8' which are provided in the shaft of the rotor 3. An inlet rotor case 9 and an outlet rotor case 10 operatively associated with the inlet ports 7 and 7' and the distribution ports 8 and 8', are respectively formed with radially equally-spaced pairs of inlet ports 12a, 12b and 12'a, 12'b and delivery ports 13a, 13b and 13'a, 13'b with predetermined positional relationships with one another. The two sets of the inlet ports 12a, 12b and 12'a, 12'b are respectively connected to separate inlet ports 15 and 15' through connecting rings 14 and 14', and the inlet ports 15 and 15' are respectively connected through electromagnetic valves 16 and 16' to a relatively low-pressure fuel supply system. The electromagnetic valves 16 and 16' are each opened by a rotational angle sensor which is not shown for every predetermined degrees of rotation of the distribution rotor 3, and the duration of this valve opening is controlled by an electric control circuit 17 shown in FIG. 1 whereby the engine operating parameters, e.g., engine speed signal, accelerator position, cooling water temperature, etc., are detected so that in accordance with the detection signals timing pulses of a time width corresponding to a predetermined relationship are generated and applied to the electromagnetic valves 16 and 16' to open the same.

With the construction described above, the operation of the system will now be described. Considering first the suction stroke of the pump chamber 6, as will be seen from FIG. 1, when the inlet port 7 of the rotor 3 is opposite to the passages 15 and 14 through the inlet port 12a of the inlet rotor case 9 thus completing a passage, a metered amount of fuel corresponding to the valve open duration of the electromagnetic valve 16 is introduced into the pump chamber 6 and consequently the plungers 4a and 4b are caused by the supply pressure and the centrifugal force due to the rotation to come down from the cam lobes 2a and 2b of the cam ring 2 and thereby to draw in the fuel. As the rotor 3 rotates further so that the pump plungers 4a and 4b begin to ride over the cam lobes 2a and 2b thus starting the delivery stroke, the inlet port 7 is closed and the pump chamber 6 is pressurized. Consequently, when the delivery port 8 is communicated with the delivery port 13a of the delivery rotor case 10 thus completing a passage, the delivery of the pressurized fuel is started and the fuel is injected from a high pressure line into the engine through an injection nozzle.

When the rotor travels through about 90 degrees of rotation from the position at which the first drawing of the fuel through the above-mentioned operation was started, the drawing of the fuel into the second pump chamber 6' is started so that through the similar operation as mentioned previously, an amount of the fuel metered by the electromagnetic valve 6' is introduced into the pump chamber 6' through the passages 15', 14' and 12' and through the rotor inlet port 7' and the fuel is injected into the engine by virtue of the suction and pressurization strokes effected by the relative motion between the pump plungers 4'a and 4'b and the cam lobes 2'a and 2'b. Thereafter, the first and second pump chambers 6 and 6' alternately perform the pump operation so that each of the electromagnetic valves 16 and 16' is opened twice for every rotation of the rotor 3 so as to inject a metered amount of the fuel into the engine.

Figure 3:
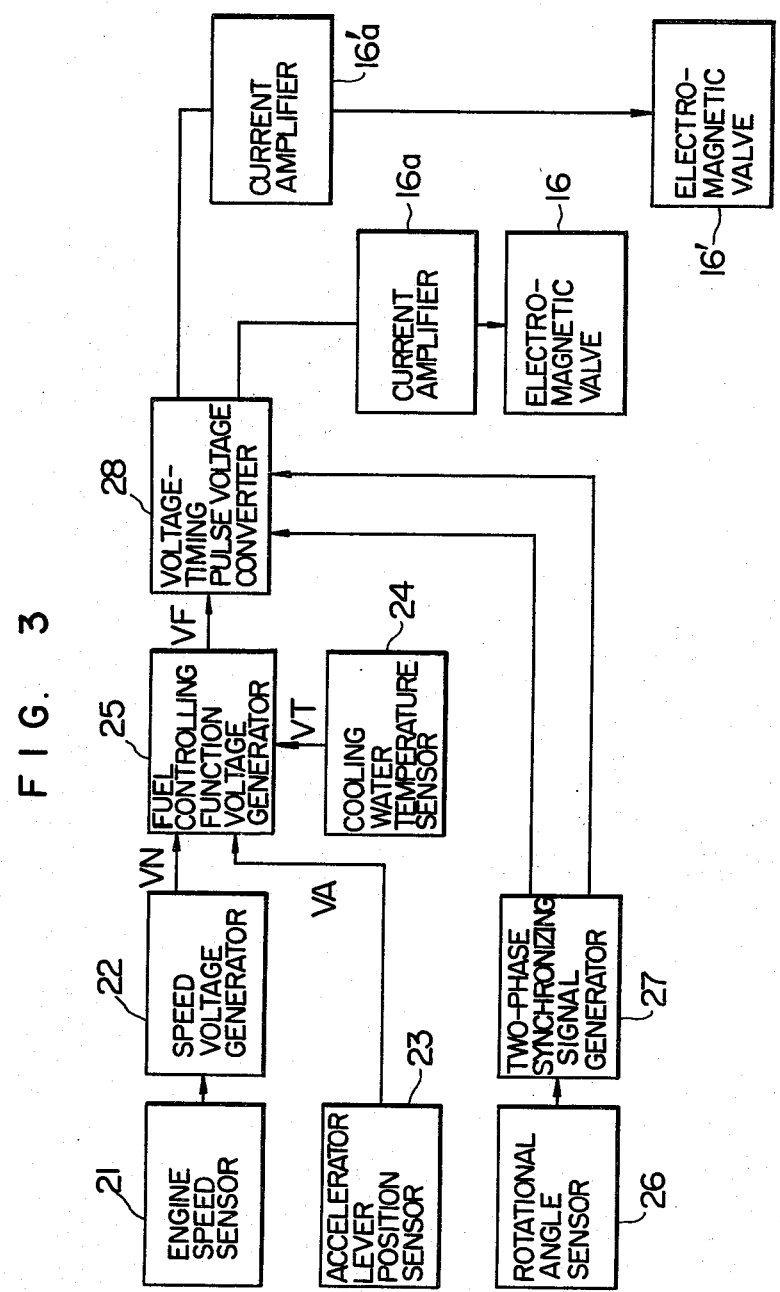
FIG. 3 is a block diagram of the electric control circuit shown in FIG. 1.

FIG. 3 illustrates the construction of the electric control circuit 17 designed to generate timing pulse voltages for opening the electromagnetic valves 16 and 16' in accordance with a predetermined fuel program. In the Figure, numeral 21 designates an engine speed sensor for generating a pulse voltage having a repetition frequency proportional to the engine rotational speed, and the sensor may comprise, for example, a combination of an electromagnetic pickup and an inductor. Numeral 22 designates a speed voltage generator for receiving as its input the signal from the engine speed sensor 21 and converting it into an engine speed voltage corresponding to the engine speed, and any known type of frequency-to-voltage converter may be used for it. Numeral 23 designates an accelerator lever position sensor for detecting the amount of movement of the accelerator lever operatively associated with the accelerator pedal or the like and operable by the driver, and it may for example be realized by means of a potentiometer operatively connected to the accelerator lever. Numeral 24 designates a cooling water temperature sensor for detecting the temperature of the engine cooling water, and it may be a temperature sensitive resistor element, e.g., thermistor. Numeral 25 designates a fuel controlling function voltage generator for receiving as control parameters the engine operating condition detection signals, that is, engine speed voltage $V_N$, acceleration lever position voltage $V_A$ and cooling water temperature voltage $V_T$ from the previously mentioned sensors to generate a function voltage which determines a predetermined value of fuel quantity to be injected into the engine, and it may be realized by a combination of known analog type function voltage generators. Numerals 26 designates a rotational angle sensor for generating a rotational angle pulse voltage for every 90 degrees of rotation of the injection pump rotor 3, and it may for example be composed of an electromagnetic pickup and an inductor. Numeral 27 designates a two-phase synchronizing signal generator for reshaping the rotational angle pulse voltage to generate two synchronizing pulse signals differing in phase, and the generator may for example be a Schmitt circuit. Numeral 28 designates a voltage-timing pulse voltage converter for serving the function of generating two-phase timing pulse voltages of a predetermined time width in synchronism with the synchronizing pulse voltages generated from the synchronizing signal generator 27, and the time width of the timing pulses may be determined in accordance with a function voltage $V_F$ generated from the fuel controlling function voltage generator 25, namely, it may comprise for example two voltage-controlled monostable timing circuits so that the synchronizing pulses from the synchronizing signal generator 27 may be converted into two-phase pulse trains and applied to the trigger signal input points of the timing circuits to thereby generate two-phase timing pulses. The electric control circuit 17 is designed so that the two-phase timing pulses are subjected to current amplification by current amplifiers 16a and 16'a and are then applied to the electromagnetic valves 16 and 16' which in turn are operated to determine the duration of valve opening and measure the fuel to be drawn into the pump.

Figure 4:
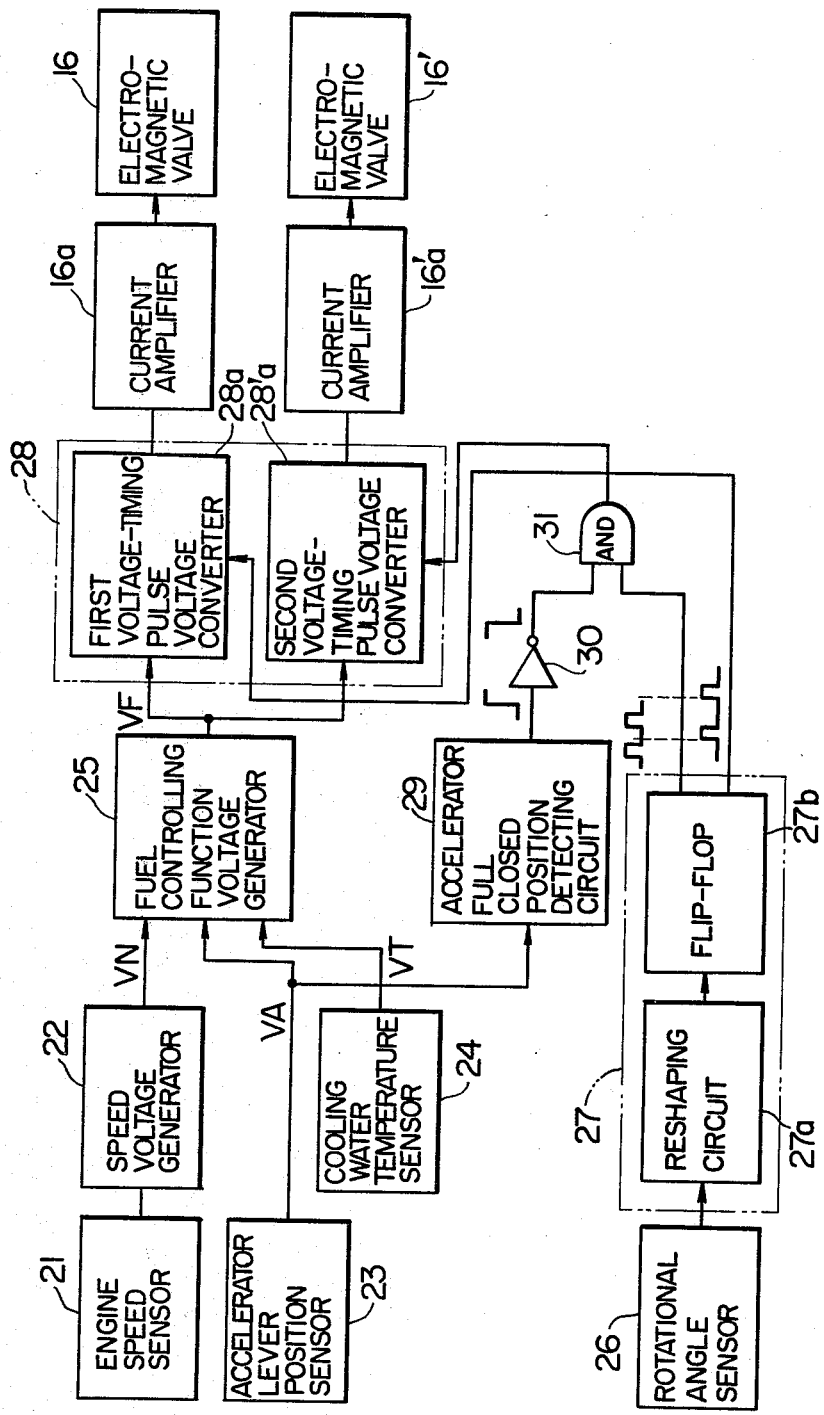
FIG. 4 is a block diagram of the electric control circuit used in another embodiment of the invention.

FIG. 4 illustrates the electric control circuit used in another embodiment of the invention, in which an accelerator full closed position detecting circuit 29 detects the full closed position of the accelerator pedal at the idling operation or the like, and a two-phase synchronizing signal generator 27 comprises a reshaping circuit 27a and two flip-flops 27b so as to generate two-phase synchronizing pulses, whereby the signals of one phase are applied to an AND circuit 31 along with an inverted signal obtained by inverting the output signal of the accelerator full closed position detecting circuit 29 through an inverter circuit 30, so that at low engine speeds, e.g., at the full closed position of the accelerator pedal or at the idling operation of the engine or the like, the passage of the synchronizing pulses is blocked to stop the operation of a second voltage-timing pulse voltage converter 28'a and thereby to stop the generation of timing pulses therefrom. Consequently, the fuel supply through the second electromagnetic valve 16' is stopped, and only a first voltage-timing pulse voltage converter 28a, that is, the first electromagnetic valve 16 is brought into operation thus metering the fuel and allowing the injection of the fuel into only one half of the engine cylinders. This can be expected to have the effect of reducing the fuel consumption during the operiods of idling operation at the accelerator fuell closed position.

While the above-mentioned electric control circuits have not been described in detail, the electromagnetic valve-controlled fuel metering system for injection pump disclosed in U.S. Pat. No. 3,762,379, the fuel controlling function voltage generator disclosed in U.S. Pat. No. 3,731,664, the voltage-timing pulse voltage converter disclosed in U.S. Pat. No. 3,685,526, and the function voltage generator control parameters disclosed in U.S. Pat. No. 3,797,465 may be suitably modified for use with the present invention.

We claim:

1. An injection pump control system comprising:
an injector pump rotor;
a plurality of mutually independent pressure feed means disposed in said rotor, each of said pressure feed means including at least a pair of inner cams and a pair of pump plungers;
a separate fuel inlet passage means provided for each of said pressure feed means;
an electromagnetic valve disposed in each of said fuel inlet passage means to open and close the same; and
an electric control circuit adapted for making the number of open-close operations of each electromagnetic valve equal to the number of operations of each pressure feed means and for controlling the duration of opening of each electromagnetic valve in accordance with the operating conditions of an engine.

2. An injection pump control system comprising:
an injector pump rotor;
a plurality of pressure feed means disposed in said rotor, each of said pressure feed means including at least a pair of inner cams and a pair of pump plungers;
a separate fuel inlet passage means provided for each of said pressure feed means;
an electromagnetic valve disposed in each of said fuel inlet passage means to open and close the same; and
an electric control circuit adapted for making the number of open-close operations of each electromagnetic valve equal to the number of operations of each pressure feed means and for controlling the duration of opening of each electromagnetic valve in accordance with the operating conditions of an engine, said electric control circuit comprising:
an engine speed sensor for generating a pulse voltage having a repetition frequency proportional to the rotational speed of said engine;
a speed voltage generator circuit connected to said engine speed sensor for generating an engine speed voltage corresponding to the rotational speed of said engine;
an accelerator lever position sensor for detecting the amount of movement of an accelerator lever operatively coupled to an accelerator pedal;
a function voltage generator circuit connected to said speed voltage generator circuit and said accelerator lever position sensor for generating a function voltage which determines a predetermined value of fuel quantity to be injected into said engine;
a rotational angle sensor for generating a rotational angle pulse voltage for every 90 degrees of rotation of said injection pump rotor;
a two-phase synchronizing signal generator circuit connected to said rotational angle sensor for subjecting said rotational angle pulse voltage to waveform reshaping to generate two-phase synchronizing pulse signals; and
a voltage-timing pulse voltage converter circuit connected to said function voltage generator circuit and said two-phase synchronizing signal generator circuit respectively for generating two-phase timing pulse voltages of a predetermined time width in synchronism with the synchronizing pulse voltages from said two-phase synchronizing signal generator circuit.

3. An injection pump control system comprising:
an injector pump rotor;
a plurality of pressure feed means disposed in said rotor, each of said pressure feed means including at least a pair of inner cams and a pair of pump plungers;
a separate fuel inlet passage means provided for each of said pressure feed means;
an electromagnetic valve disposed in each of said fuel inlet passage means to open and close the same; and
an electric control circuit adapted for making the number of open-close operations of each electromagnetic valve equal to the number of operations of each pressure feed means and for controlling the duration of opening of each electromagnetic valve in accordance with the operating conditions of an engine, said electric control circuit comprising:
an engine speed sensor for generating a pulse voltage having a repetition frequency proportional to the rotational speed of said engine;
a speed voltage generator circuit connected to said engine speed sensor for generating an engine speed voltage corresponding to the rotational speed of said engine;
an accelerator lever position sensor for detecting the amount of movement of an accelerator lever operatively coupled to an accelerator pedal;
a function voltage generator circuit connected to said speed voltage generator circuit and said accelerator lever position sensor respectively, for generating a function voltage which determines a predetermined value of fuel quantity to be injected into said engine;
a rotational angle sensor for generating a rotational angle pulse voltage for every 90 degrees of rotation of said injection pump rotor;
a two-phase synchronizing signal generator circuit connected to said rotational angle sensor for subjecting said rotational angle pulse voltage to waveform reshaping to generate two synchronizing pulse signals of first and second phases;
an accelerator full closed position detecting circuit connected to said accelerator lever position sensor for detecting a full closed position of said accelerator pedal at idling operation;
an AND circuit connected to said accelerator full closed position detecting circuit and a first phase output of the two phase outputs of said two-phase synchronizing signal generator circuit respectively, for blocking the passage of said first phase output signal in response to an output signal of said accelerator full closed position detecting circuit;
a first voltage-timing pulse voltage converter circuit connected to said function voltage generator circuit and a second pulse output of the two phase outputs of said two-phase synchronizing signal generator circuit respectively, for generating a timing pulse voltage of a predetermined time width in synchronism with a synchronizing pulse voltage from said two-phase synchronizing signal generator circuit; and a second voltage-timing pulse voltage converter circuit connected to said function voltage generator circuit and said AND circuit respectively, to respond to an output signal of said AND circuit to stop the operation of generating a timing pulse voltage of a predetermined time width.

* * * * *